United States Patent
Smyth et al.

(10) Patent No.: US 9,230,294 B2
(45) Date of Patent: Jan. 5, 2016

(54) PRESERVING AND REUSING INTERMEDIATE DATA

(71) Applicant: DreamWorks Animation LLC, Glendale, CA (US)

(72) Inventors: Evan P. Smyth, Glendale, CA (US); Peter McNerney, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 71 days.

(21) Appl. No.: 13/844,424

(22) Filed: Mar. 15, 2013

(65) Prior Publication Data

US 2014/0267291 A1    Sep. 18, 2014

(51) Int. Cl.
| | | |
|---|---|---|
| G06T 11/20 | (2006.01) | |
| G06T 1/20 | (2006.01) | |
| G06T 1/60 | (2006.01) | |
| G06T 13/00 | (2011.01) | |

(52) U.S. Cl.
CPC ... *G06T 1/20* (2013.01); *G06T 1/60* (2013.01); *G06T 13/00* (2013.01)

(58) Field of Classification Search
CPC .................................................. G06T 11/206
USPC ........................................................ 345/440
See application file for complete search history.

(56) References Cited

U.S. PATENT DOCUMENTS

| | | | |
|---|---|---|---|
| 4,922,413 A | 5/1990 | Stoughton et al. | |
| 5,329,360 A * | 7/1994 | Gillard et al. | 348/472 |
| 5,675,752 A | 10/1997 | Scott et al. | |
| 5,808,617 A | 9/1998 | Kenworthy et al. | |
| 5,808,625 A | 9/1998 | Picott et al. | |
| 5,896,139 A | 4/1999 | Strauss | |
| 5,982,389 A | 11/1999 | Guenter et al. | |
| 5,986,667 A | 11/1999 | Jevans | |
| 6,154,215 A | 11/2000 | Hopcroft et al. | |
| 6,243,856 B1 | 6/2001 | Meyer et al. | |

(Continued)

FOREIGN PATENT DOCUMENTS

| | | |
|---|---|---|
| EP | 1918880 A2 | 5/2008 |
| EP | 1918881 A2 | 5/2008 |

(Continued)

OTHER PUBLICATIONS

Extended European Search Report received for European Patent Application No. 14160117.9, mailed on May 26, 2014, 7 pages.

(Continued)

*Primary Examiner* — Javid A Amini
(74) *Attorney, Agent, or Firm* — Morrison & Foerster LLP (57) ABSTRACT

Preservation and reuse of intermediate data generated in a render setup graph for computer animation is disclosed. A processing node in the graph can generate intermediate data and, rather than send it directly to a downstream node in the graph, preserve it for reuse during subsequent processing. As a result, a downstream processing node can reuse the preserved intermediate data, rather than wait while the intermediate data is generated by the processing node in realtime. An intermediate data file management module can manage this process by storing the generated intermediate data in a file for preservation, retrieving the stored intermediate data from the file for reuse, optimizing the file storage location for speed and efficiency, and facilitating sharing of the intermediate data during collaboration between users.

22 Claims, 9 Drawing Sheets

(56) References Cited

U.S. PATENT DOCUMENTS

| | | | |
|---|---|---|---|
| 6,252,608 B1 | 6/2001 | Snyder et al. | |
| 6,263,103 B1 | 7/2001 | Freeman et al. | |
| 6,272,650 B1 | 8/2001 | Meyer et al. | |
| 6,496,190 B1 | 12/2002 | Driemeyer et al. | |
| 6,556,200 B1 | 4/2003 | Pfister et al. | |
| 6,611,262 B1 | 8/2003 | Suzuki | |
| 6,760,485 B1 | 7/2004 | Gilman et al. | |
| 6,919,891 B2 | 7/2005 | Schneider et al. | |
| 7,174,039 B2* | 2/2007 | Koo et al. | 382/154 |
| 7,414,626 B1 | 8/2008 | Picott | |
| 7,439,982 B2 | 10/2008 | Deniau et al. | |
| 7,548,238 B2 | 6/2009 | Berteig et al. | |
| 7,911,472 B2 | 3/2011 | Harper | |
| 7,920,143 B1* | 4/2011 | Haratsch et al. | 345/473 |
| 8,009,176 B2* | 8/2011 | Zimmer | 345/589 |
| 8,259,110 B1* | 9/2012 | Carr et al. | 345/426 |
| 8,274,506 B1* | 9/2012 | Rees | 345/419 |
| 8,339,402 B2 | 12/2012 | Henson et al. | |
| 8,352,397 B2 | 1/2013 | Rubin et al. | |
| 8,352,443 B1 | 1/2013 | Polson et al. | |
| 8,369,564 B2* | 2/2013 | Hervas et al. | 382/100 |
| 8,612,485 B2 | 12/2013 | Selan et al. | |
| 8,624,898 B1 | 1/2014 | Bugaj et al. | |
| 8,773,433 B1 | 7/2014 | Smyrl | |
| 2001/0027388 A1* | 10/2001 | Beverina et al. | 703/22 |
| 2002/0063704 A1* | 5/2002 | Sowizral et al. | 345/419 |
| 2002/0099684 A1 | 7/2002 | Ardoin et al. | |
| 2002/0128841 A1 | 9/2002 | Kibre et al. | |
| 2002/0140707 A1 | 10/2002 | Samra et al. | |
| 2002/0163518 A1 | 11/2002 | Rising, III et al. | |
| 2002/0188613 A1 | 12/2002 | Chakraborty et al. | |
| 2003/0156117 A1 | 8/2003 | Higuchi et al. | |
| 2004/0052450 A1* | 3/2004 | Morrison | 385/24 |
| 2004/0109501 A1 | 6/2004 | Wollborn | |
| 2004/0160445 A1 | 8/2004 | Whatmough | |
| 2004/0189668 A1 | 9/2004 | Beda et al. | |
| 2004/0194020 A1 | 9/2004 | Beda et al. | |
| 2004/0222989 A1 | 11/2004 | Zhang et al. | |
| 2004/0222992 A1 | 11/2004 | Calkins et al. | |
| 2005/0039176 A1 | 2/2005 | Fournie | |
| 2005/0110790 A1 | 5/2005 | D'Amora | |
| 2005/0140694 A1 | 6/2005 | Subramanian et al. | |
| 2005/0256950 A1 | 11/2005 | Suzuki | |
| 2005/0262470 A1 | 11/2005 | Gavrilov | |
| 2006/0176403 A1 | 8/2006 | Gritton et al. | |
| 2007/0080964 A1* | 4/2007 | Kainz et al. | 345/440 |
| 2007/0176926 A1 | 8/2007 | Garcia et al. | |
| 2007/0185881 A1* | 8/2007 | Vienneau et al. | 707/10 |
| 2008/0028414 A1* | 1/2008 | Couture-Gagnon et al. | 718/106 |
| 2008/0049033 A1 | 2/2008 | Yang | |
| 2008/0117216 A1 | 5/2008 | Dorie | |
| 2008/0122838 A1 | 5/2008 | Hoover et al. | |
| 2008/0231633 A1 | 9/2008 | Keller et al. | |
| 2008/0238916 A1 | 10/2008 | Ghosh et al. | |
| 2008/0278482 A1 | 11/2008 | Farmanbar et al. | |
| 2009/0021513 A1 | 1/2009 | Joshi et al. | |
| 2009/0027380 A1* | 1/2009 | Rajan et al. | 345/419 |
| 2010/0079462 A1 | 4/2010 | Breeds et al. | |
| 2010/0123723 A1* | 5/2010 | Collard et al. | 345/473 |
| 2010/0134501 A1 | 6/2010 | Lowe et al. | |
| 2010/0177104 A1 | 7/2010 | Dufour et al. | |
| 2010/0214284 A1* | 8/2010 | Rieffel et al. | 345/419 |
| 2010/0214313 A1 | 8/2010 | Herman et al. | |
| 2010/0289804 A1* | 11/2010 | Jackman et al. | 345/520 |
| 2010/0302249 A1 | 12/2010 | Fowler et al. | |
| 2010/0322358 A1 | 12/2010 | Drumm et al. | |
| 2011/0090236 A1 | 4/2011 | Calsyn et al. | |
| 2011/0106843 A1* | 5/2011 | Pan et al. | 707/769 |
| 2011/0181606 A1 | 7/2011 | Sumner et al. | |
| 2011/0182479 A1 | 7/2011 | Sese et al. | |
| 2011/0206200 A1* | 8/2011 | Sovio et al. | 380/30 |
| 2011/0234587 A1 | 9/2011 | Maigret et al. | |
| 2011/0316854 A1 | 12/2011 | Vandrovec | |
| 2012/0095745 A1 | 4/2012 | Le Guevel-Scholtens et al. | |
| 2012/0113125 A1 | 5/2012 | Guerrab et al. | |
| 2012/0166446 A1 | 6/2012 | Bowman et al. | |
| 2012/0280991 A1 | 11/2012 | Maloney et al. | |
| 2012/0280995 A1 | 11/2012 | Anderson | |
| 2012/0284664 A1 | 11/2012 | Zhao | |
| 2013/0090850 A1* | 4/2013 | Mays | 701/533 |
| 2013/0120421 A1* | 5/2013 | Maguire | 345/581 |
| 2013/0120422 A1* | 5/2013 | Rao et al. | 345/581 |
| 2013/0127891 A1* | 5/2013 | Kim et al. | 345/582 |
| 2014/0035908 A1 | 2/2014 | Powell et al. | |
| 2014/0059564 A1 | 2/2014 | Vigneras et al. | |
| 2014/0108485 A1* | 4/2014 | Geibel et al. | 709/201 |

FOREIGN PATENT DOCUMENTS

| | | |
|---|---|---|
| EP | 2779100 A1 | 9/2014 |
| WO | 01/63561 A1 | 8/2001 |
| WO | 2007/146800 A2 | 12/2007 |
| WO | 2007146800 A3 | 11/2008 |
| WO | 2012/174128 A1 | 12/2012 |

OTHER PUBLICATIONS

International Search Report and Written Opinion received for PCT Patent Application No. PCT/US2014/026792, mailed on Aug. 11, 2014, 7 pages.
Open Inventor Toolkit Tutorial, "Chapter 3. Nodes and Groups and Chapter 4. Cameras and Lights", Available at <http://www-evasion.imag.fr/Membres/Francois.Faure/doc/inventorMentor/sgi_html/ch03.html>, Retrieved on Oct. 18, 2013, 61 pages.
Schmalstieg et al., "Modeling and Rendering of Outdoor Scenes for Distributed Virtual Environments", ACM VRST '97 Lausanne Switzerland, 1997, pp. 209-215.
Sun Microsystems, "Reusing Scene Graphs", Java 3D API Specification, Available at <http://docs.oracle.com/cd/E17802_01/j2se/javase/technologies/desktop/java3d/forDevelopers/j3dguide/SceneGraphSharing.doc.html>, Jun. 1999, pp. 1-11.
International Search Report & Written Opinion received for PCT Patent Application No. PCT/US2014/026799, mailed on Sep. 26, 2014, 11 pages.
"Intro to Animation", Power Point Presentation, available online at <http://visservices.sdsc.edu/courses/maya/spring06/introtoanim.ppt>, accessed on Apr. 30, 2013, 32 pages.
"JUNG (Java Universal Network/Graph) Framework Manual, Filtering", available online at <http://jung.sourceforge.net/doc/manual.html#filter>, retrieved on Apr. 30, 2013, 13 pages.
"WebKit Coordinated Graphics System", available online at <http://trac.webkit.org/wiki/CoordinatedGraphicsSystem>, retrieved on Apr. 30, 2013, 9 pages.
Carstarphen, John, "Lighting Effects in Cinema 4D Animation", available online at <http://www.ehow.com/video_4444919_lighting-effects-cinema-4d-animation.html>, retrieved on Apr. 30, 2013, 2 pages.
Illinois Simulator Lab, "Syzygy Documentation: Programming and Application Frameworks", available online at <http://syzygy.isl.uiuc.edu/szg/doc/Programming.html>, retrieved on Apr. 30, 2013, Dec. 17, 2012, 11 pages.
Lu et al. "Knowledge-Based Digital Media Processing: Generic Object Registration using Multiple Hypotheses Testing in Partition Trees", IEE Proc.-Vis. Image Signal Process, vol. 153, No. 3, Jun. 2006, pp. 323-330.
Oishi et al., "Parallel Alignment of a Large Number of Range Images", Proceedings of the Fourth International Conference on 3-D Digital Imaging and Modeling (3DIM'03), IEEE Computer Society, 2003, 8 pages.
Techfuels, "The Lighting Scene in 3D Animation", available online at <http://www.techfuels.com/applications/9895-lighting-scene-3d-animation.html>, retrieved on Apr. 30, 2013, 3 pages.
Toon Boom Animation, "Lighting Effects", available online at <http://beta.toonboom.com/home-users/toon-boom-studio/resources/tips-and-tricks/lighting-effects>, retrieved on Apr. 30, 2013, 2 pages.
Van Der Beek, Jelle, "Dependency Graphs in Games", Gamasutra The Art & Business of Making Games, available at <http://www.

(56) References Cited

OTHER PUBLICATIONS gamasutra.com/viewifeature/131221/dependency_graphs_in_games.php?print=1>, accessed on Apr. 30, 2013, 15 pages.
Invitation to pay additional fees received for PCT Patent Application No. PCT/US2014/026799, mailed on Jul. 25, 2014, 2 pages.
Final Office Action received for U.S. Appl. No. 13/843,695, mailed on Feb. 23, 2015, 21 pages.
Non Final Office Action received for U.S. Appl. No. 13/843,980, mailed on Feb. 5, 2015, 15 pages.
Non Final Office Action received for U.S. Appl. No. 13/844,016, mailed on Feb. 5, 2015, 23 pages.
Non-Final Office Action received for U.S. Appl. No. 13/844,363, mailed on Feb. 24, 2015, 9 pages.
Non-Final Office Action received for U.S. Appl. No. 13/831,309, mailed on Feb. 24, 2015, 8 pages.
Rossler et al., "Dynamic Shader Generation for Flexible Multi-Volume Visualization", IEEE Pacific Visualisation Symposium, Mar. 2008, pp. 17-24.
Notice of Allowance received for U.S. Appl. No. 13/831,482, mailed on Mar. 4, 2015, 5 pages.
Non-Final Office Action received for U.S. Appl. No. 13/844,497, mailed on Mar. 13, 2015, 21 pages.
Ex-Parte Quayle Action received for U.S. Appl. No. 13/831,482, mailed on Nov. 24, 2014, 7 pages.
Non Final Office Action received for U.S. Appl. No. 13/843,695, mailed on Oct. 22, 2014, 16 pages.
Barrett et al., "A Monotonic Superclass Linearization for Dylan", Oopsla 96, Jun. 28, 1996, pp. 69-82.
Notice of Allowance received for U.S. Appl. No. 13/831,309, mailed on Jul. 21, 2015, 14 pages.
Final Office Action received for U.S. Appl. No. 13/844,363, mailed on Aug. 6, 2015, 12 pages.
Notice of Allowance received for U.S. Appl. No. 13/844,380, mailed on Jul. 17, 2015, 7 pages.
Final Office Action received for U.S. Appl. No. 13/831,309, mailed on Jun. 5, 2015, 8 pages.
Non-Final Office Action received for U.S. Appl. No. 13/831,482, mailed on Apr. 20, 2015, 8 pages.
Non Final Office Action received for U.S. Appl. No. 13/844,113, mailed on Apr. 10, 2015, 10 pages.
Non-Final Office Action received for U.S. Appl. No. 13/844,380, mailed on Apr. 2, 2015, 9 pages.
Extended European Search Report (includes Supplementary European Search Report and Search Opinion) received for European Patent Application No. 14160119.5, mailed on Jun. 30, 2015, 11 pages.
"Robocopy.exe Robust File Copy Utility Version XP010", Microsoft Corporation, 2003, pp. 1-35.
"Open Inventor toolkit Tutorial", Chapter 3. Nodes and Groups and Chapter 4. Cameras and Lights, Available online at <http://www-evasion.imag.fr/Membres/Francois.Faure/doc/inventorMentor/sgi_html/ch03.html>, Retrieved on Oct. 18, 2013, 61 pages.
Bederson et al., "Toolkit Design for Interactive Structured Graphics", IEEE Transactions on Software Engineering, vol. 30, No. 8, Aug. 2004, pp. 535-546.
Qi-Cheng et al., "High-Extensible Scene Graph Framework Based on Component Techniques", Journal of Zhejiang University Science A, vol. 7, No. 7, 2006, pp. 1247-1252.
Dobos et al., "3D Revision Control Framework", Web3D, 2012, pp. 121-129.
Dollner et al., "Object-Oriented 3D Modelling, Animation and Interaction", The Journal of Visualization and Computer Animation, vol. 8, 1997, pp. 33-64.
Tobler, Robert F., "Separating Semantics from Rendering: A Scene Graph Based Architecture for Graphics Applications", Visual Computer, vol. 27, 2011, pp. 687-695.
Wernecke, Josie, "The Inventor Mentor: Programming Object-Oriented 3D Graphics with Open Inventor™, Release 2", Addison-Wesley Publishing Company, Chapter 3. Nodes and Groups, 1994, 20 pages.

* cited by examiner

Fig. 11

PRESERVING AND REUSING INTERMEDIATE DATA

BACKGROUND

1. Field

The present disclosure relates to computer-generated animation and, more specifically, to preserving and reusing intermediate data generated by processing nodes of a render setup graph for computer-generated animation.

2. Related Art

A computer-generated scene can be created by rendering one or more computer-generated objects to depict the scene. Light sources, materials, textures, and other visual effects can be associated with the objects to create a realistic visual appearance for the scene. A render setup graph can be used to define the objects and their associated visual effects to be rendered. The graph can typically include one or more interconnected nodes associating the objects and their visual effects, where a node can generate intermediate data that a downstream node needs to complete its processing.

The intermediate data can be very valuable to the downstream node. In some cases, however, the data can be difficult to generate and/or can require substantial time and resources to do so. As a result, rendering the scene can be substantially delayed while the downstream node awaits the intermediate data. This has often led animators or users to run batch processing on the render setup graph, sometimes overnight, while working on other projects.

Accordingly, there is a need to substantially reduce or eliminate the delay in the rendering process caused by intermediate data generation as well as to simplify the management of that intermediate data.

SUMMARY

This relates to preserving and reusing intermediate data generated by processing nodes of a render setup graph in computer animation. A processing node can generate intermediate data and, rather than send it directly to a downstream node, preserve it for reuse during subsequent processing. As a result, a downstream processing node can reuse the preserved intermediate data, rather than wait until the intermediate data is generated in realtime by an upstream node. A file management module can manage this preservation and reuse by storing the generated intermediate data in a file for preservation, retrieving the stored intermediate data from the file for reuse, optimizing the data storage location for speed and efficiency, and facilitating sharing of the intermediate data during a collaboration between animators or users.

Several advantages can be realized with intermediate data preservation and reuse. An animator or user need not wait for intermediate data to be generated before beginning downstream node processing. Because of optimal storage, the animator or user can realize local data transmission speeds even though the immediate data storage may be remote. Additionally, the file management module can provide a level of abstraction on top of the intermediate data such that the animator or user need not know the file location and other details in order to access the intermediate data file. Rather, a logical reference to the file can be used with the underlying details transparent to the animator or user. Moreover, the animator or user can reuse the preserved intermediate data in different render setup graphs, not only the graph in which the data was generated. And, a particular set of intermediate data can be associated with a specific configuration so the file management module can deliver guarantees about the suitability of the data for reuse relative to the specific configuration in force when the data was generated.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

This relates to preserving and reusing intermediate data generated by processing nodes of a render setup graph in computer animation. A processing node can generate intermediate data and, rather than send it directly to a downstream node, preserve it for reuse during subsequent processing. As a result, a downstream processing node can reuse the preserved intermediate data, rather than wait while the intermediate data is generated in realtime by the processing node. An intermediate data file management module can manage this process by storing the generated intermediate data in a file for preservation, retrieving the stored intermediate data from the file for reuse, optimizing the storage location for speed and efficiency, and facilitating sharing of the intermediate data during a collaboration between animators or users.

In implementation, a processing node in a render setup graph can be configured to disable its connection to downstream processing nodes while it generates and send intermediate data to storage, and to enable its connection to downstream nodes while it directly sends the generated intermediate data to the downstream nodes. Similarly, a processing node in a render setup graph can be configured to either receive preserved intermediate data from storage or directly receive newly generated intermediate data from upstream processing nodes. An intermediate data file management module can be in communication with a render setup graph via a network to manage the intermediate data preservation and reuse.

In operation, an intermediate data file management module can receive a request from a processing node of a render setup graph to preserve intermediate data generated by the node. The module can then optimally store the intermediate data in a file associated with the node. The filename can be based on the name of the node and its context in the graph, i.e., what it is used for. The module can also receive a request from a processing node of the render setup graph to reuse the previously preserved intermediate data. The module can then retrieve the requested intermediate data file from storage and send the file to the node for processing.

In further operation, when a processing node wishes to preserve intermediate data, the node can generate intermediate data, send a request to an intermediate data file management module to preserve the data, and then send the data to the module for storage. When a processing node wishes to reuse preserved intermediate data, the node can send a query for the filename to the upstream node that previously generated the data, send a request to the intermediate data file management module to retrieve the data from storage, import the received intermediate data, and process the data for rendering a scene.

Preservation and reuse of intermediate data can provide several advantages. First, an animator or user need not wait for intermediate data to be generated before beginning downstream node processing. Second, because of optimal storage, the animator or user can realize local data transmission speeds even though the immediate data storage may be remote. Third, the file management module can provide a level of abstraction on top of the intermediate data such that the animator or user need not know the file location and other details in order to access the intermediate data file. Rather, a logical reference to the file can be used with the underlying details transparent to the animator or user. Fourth, the animator or user can reuse the preserved intermediate data in different render setup graphs, not only the graph in which the data was generated. Fifth, a particular set of intermediate data can be associated with a specific configuration so the file management module can deliver guarantees about the suitability of the data for reuse relative to the specific configuration in force when the data was generated. This can be made possible by the fact that no external mechanism is able to access that file thus ensuring that only the file management module is able to update it.

Figure 1:
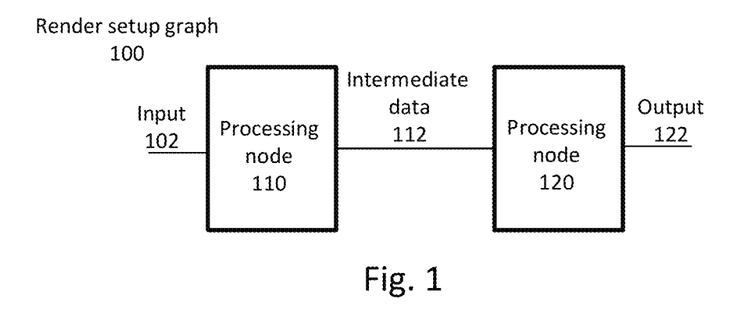
FIG. 1 illustrates exemplary portions of a render setup graph that generates and passes intermediate data between processing nodes of the graph.

FIG. 1 illustrates exemplary portions of a render setup graph that generates and passes intermediate data between processing nodes of the graph for rendering a scene. In FIG. 1, render setup graph 100 can include two interconnected nodes 110, 120. The first node 110 can receive input data 102, process the input data to generate intermediate data 112, and output the intermediate data to the second node 120. The second node 120 can then process the intermediate data 112 to generate output data 122 for rendering a scene.

As an example, the rendering process can typically involve two steps: rasterizing and shading. The rasterizing step can involve creating a scene to mimic the scene viewed through a camera and then recording the surfaces, materials and textures assigned to the surface, normal vectors to the surface, and so on. The rasterizing step can output intermediate data that includes a known position, material, normal vector, and the like, except shading, at each scene pixel. The shading step can then process the intermediate data to apply shading at each pixel. Computing the intermediate data in the rasterizing step can be time and resource intensive, such that the shading step has to wait for the data before starting.

Because intermediate data can require substantial time and resources to generate and/or be difficult to generate, there can be an undesirable delay at the second node 120 in receiving and processing the intermediate data, thereby delaying the rendering process. Accordingly, reusing previously generated intermediate data at the second node 120 can advantageously save time and resources while providing a faster render.

Figure 2:
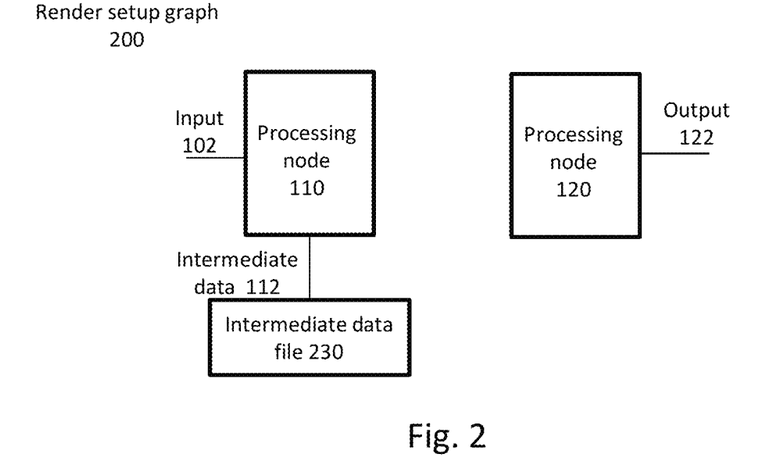
FIG. 2 illustrates exemplary portions of a render setup graph that preserves intermediate data generated by a processing node of the graph.

FIG. 2 illustrates the exemplary portions of the render setup graph of FIG. 1 modified to preserve intermediate data for reuse so as to substantially reduce or eliminate the undesirable delay. In FIG. 2, the first node 110 can receive the input data 102 and process the input data to generate intermediate data 112. The first node 110 can then send the intermediate data 112 to file 230 to be stored for reuse by any node needing that intermediate data, e.g., the second node 120 when the render setup graph is processed again, or another node in a different render setup graph. The connection between the first node 110 and the second node 120 can be disabled, as illustrated in FIG. 2, during the preservation of the intermediate data 112. The connection can be re-enabled when the first node 110 wishes to send generated intermediate data 112 or any other data directly to the second node 120.

As an example, an animator or user can configure a rasterizing node of a render setup graph to save intermediate data to a file for reuse. The animator or user can then process the rasterizing node to generate and preserve the intermediate data in a file.

Figure 3:
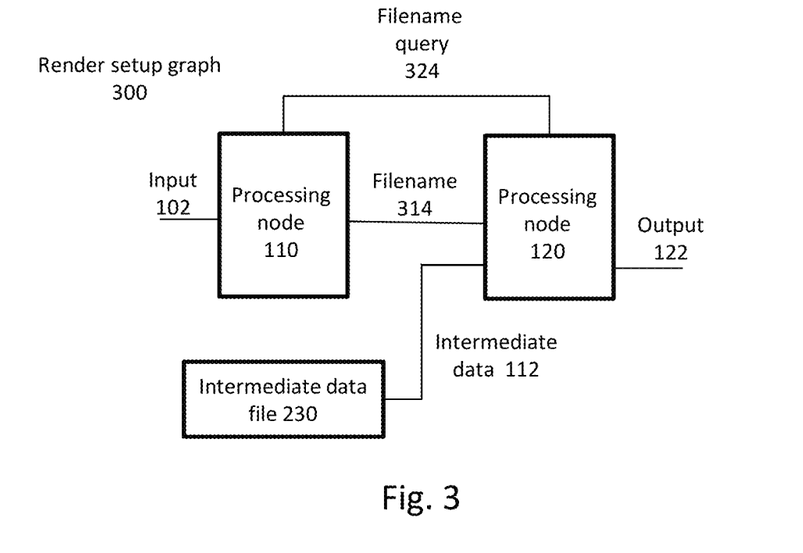
FIG. 3 illustrates exemplary portions of a render setup graph that reuses previously preserved intermediate data in a processing node of the graph.

FIG. 3 illustrates the exemplary portions of the render setup graph of FIG. 1 modified to reuse previously generated intermediate data, thereby substantially reducing or eliminating the undesirable delay. In FIG. 3, the first node 110 can receive query 324 from the second node 120 for the name of the file storing the previously generated intermediate data. The first node 110 can send the filename 314 to the second node 120, which can then access the file 230 and import the intermediate data 112 from the file. The second node 120 can process the intermediate data 112 to generate output data 122 for rendering a scene. Unlike the rendering process of FIG. 1, the rendering process in FIG. 3 need not delay the processing at the second node 120 while waiting for the first node 110 to finish its processing. Rather, the second node 120 can reuse the intermediate data 112 that the first node 110 previously generated.

As an example, an animator or user can configure a shading node of a render setup graph to import intermediate data from a file rather than wait until a rasterizing node in the graph generates the data. To do so, the shading node can query the rasterizing node for the name of the file to which the rasterizing node previously sent its intermediate data, as illustrated in FIG. 2. The shading node can then process the previously generated intermediate data to apply shading at each pixel.

Intermediate data preservation and reuse can be applied in many cases. In some cases, the intermediate data can represent a static effect and can therefore be reused whenever that effect is present in a scene. In other cases, the intermediate data can represent a slightly changing effect, such that the data slowly becomes obsolete over time. However, the effective change can be sufficiently small such that it introduces negligible error into the scene rendered from the reused data. In still other cases, the intermediate data can represent a more dynamic effect, such that the data becomes obsolete more rapidly. However, the data can still be reused with a mechanism to identify and compensate for the error introduced in the scene rendered from the reused data.

Figure 4:
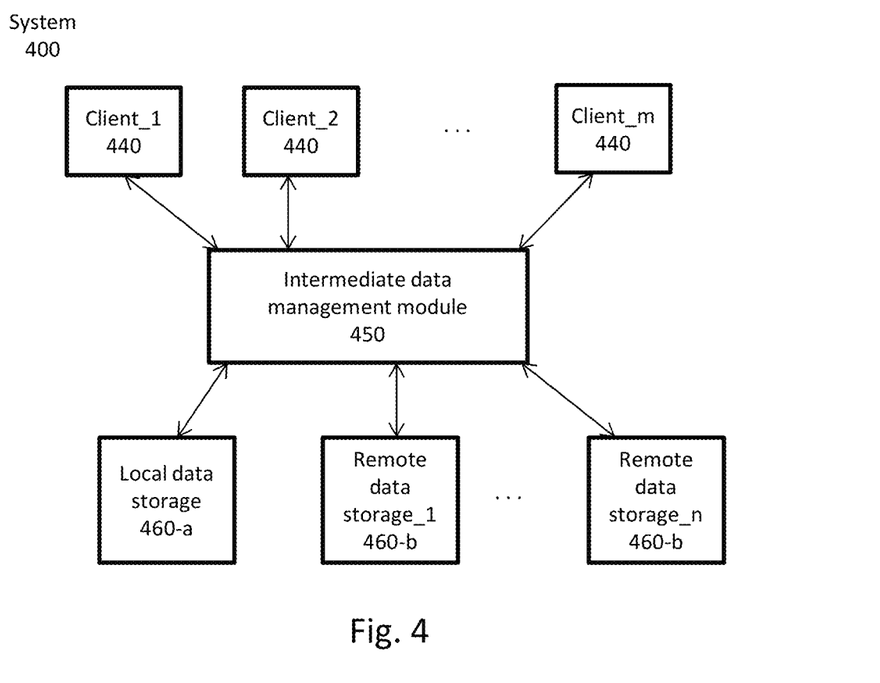
FIG. 4 illustrates an exemplary system for preserving and reusing intermediate data for processing nodes of a render setup graph.

FIG. 4 illustrates an exemplary system for preserving and reusing intermediate data for processing nodes of a render setup graph. In FIG. 4, system 400 can include intermediate data file management module 450 configured to manage creation, storage, retrieval, and sharing of intermediate data files generated by processing nodes of a render setup graph. The system 400 can also include one or more clients 440 in communication with the module 450 via a network, where the clients can be configured to process a render setup graph to generate intermediate data, send generated intermediate data to the module for preservation, reuse previously generated intermediate data, and request previously generated data from the module for reuse. The render setup graph can be displayed on a computer display and manipulated using a graphical user interface and computer I/O hardware, as described in more detail below. The system 400 can further include local data storage 460-a and remote data storage 460-b in communication with the module 450 via a network to store generated intermediate data for reuse.

The intermediate data file management module 450 can provide a meaningful abstraction on top of the intermediate data so that the clients 440 can seamlessly access intermediate data stored anywhere in the system 400 without needing to know the data file path or other specific characteristics of the intermediate data. Rather, the module 450 can easily establish the files in the storage units 460-a, 460-b at a location visible and accessible to the clients 440, while hiding the file implementation details. As such, an animator or user need not embed the file path or other intermediate data details in the processing nodes of the render setup graph. Instead, the animator or user can use a logical reference to the file while the underlying file details are transparent to them.

Below is example pseudo-code, representative of the module abstraction intermediate_data:

```
class intermediate_data
{
    variable filepath;
    variable filename;
    method preserve_data;
    method import_preserved_data;
    method manage_file_storage;
    method share_data;
}
``` where filepath represents the storage location of an intermediate data file; filename represents the intermediate data filename; preserve_data represents a method executed by the module 450 to create the file and save the intermediate data therein; import_preserved_data represents a method executed by the module to retrieve a requested immediate data file from storage to send to the requesting processing node in a render setup graph; manage_file_storage represents a method executed by the module to optimize storage of the intermediate data file among the storage units 460-a, 460-b; and share_data represents a method executed by the module to share intermediate data files during collaborations between clients 440. These methods will be described in more detail below.

In one example, the system 400 can represent a physical system, including client computers 440 configured to preserve and reuse intermediate data generated by a processing node of a render setup graph executing on the computers; an intermediate data file management server 450 configured to manage the preservation and reuse of intermediate data; and local and remote storage disks 460-a, 460-b configured to store intermediate data files. In another example, the system 400 can represent a virtual system executing on one or more computing devices, including client applications 440 configured to preserve and reuse intermediate data; an intermediate data file management application 450 configured to manage the preservation and reuse of intermediate data; and local and remote storage applications 460-a, 460-b configured to virtually store intermediate data files.

Figure 5:
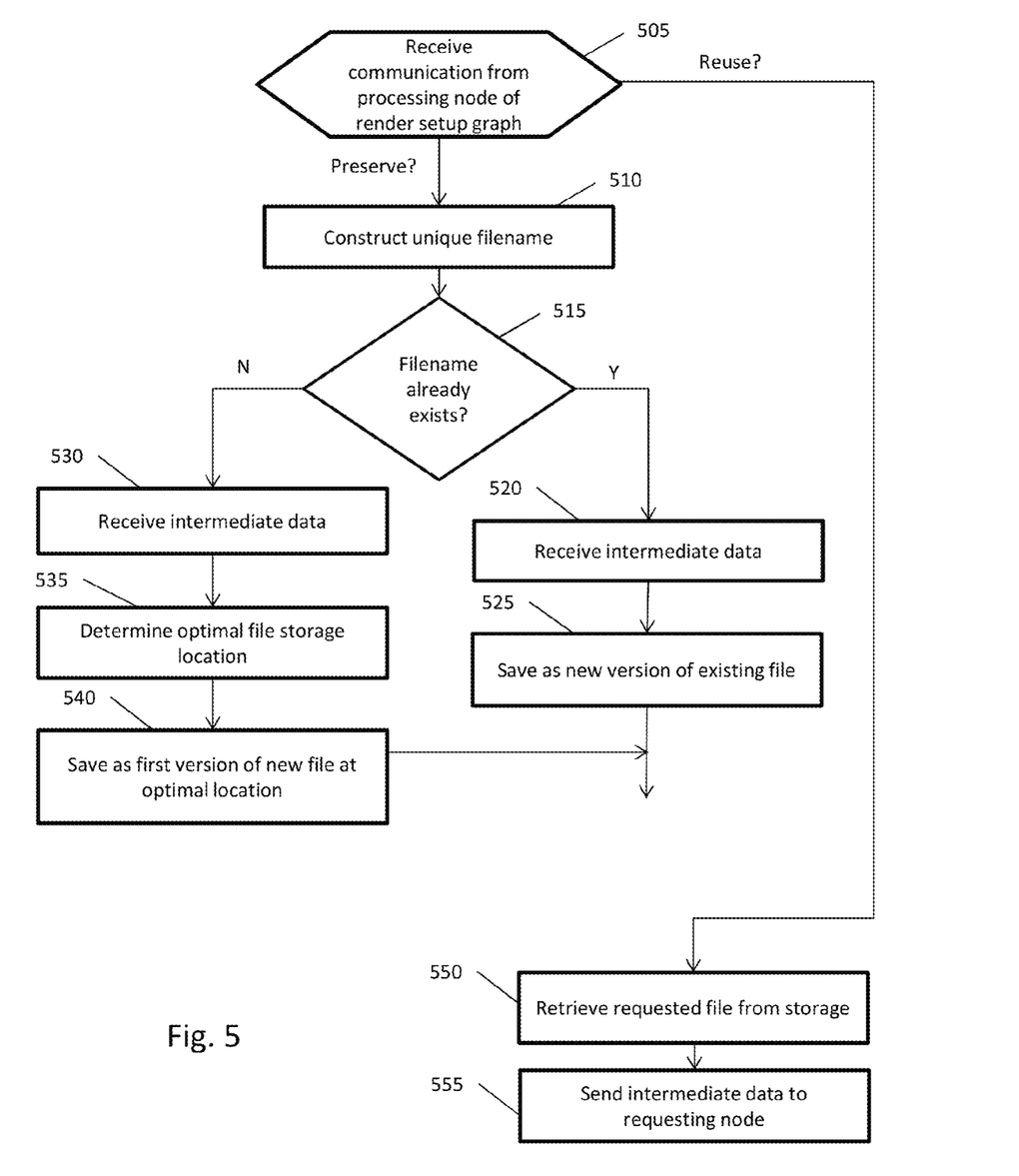
FIG. 5 illustrates an exemplary method for preserving and reusing intermediate data for processing nodes of a render setup graph.

FIG. 5 illustrates an exemplary method for preserving and reusing intermediate data for processing nodes of a render setup graph. The method can be performed by the intermediate data file management module of FIG. 4, for example. In FIG. 5, the module can receive a communication from a processing node of a render setup graph (505). If the communication is a request from a processing node to preserve intermediate data generated by the node (505), the module can construct a unique filename based on the processing node's name and its context (510). For example, a rasterizing node for rendering an animal can have a filename rasterizing_animal. The module can then determine whether the filename already exists in storage (515). If so, the module can receive the intermediate data from the node (520) and save the data in a new version of the file (525). This can create multiple versions of the file that are bundled together as a series of intermediate data. An animator or user can access earlier version of the data, if needed. If the filename does not exist (515), the module can receive the intermediate data from the node (530), determine an optimal storage location for the file (535), and save the data in the file at the optimal storage location (540). The module can determine an optimal storage location based on several factors, such as availability, free space, retrieval speed, relative location to clients, where related processing nodes are executed, and the like. An exemplary method to determine an optimal storage location will be described in more detail below.

If the communication is a request from a processing node to reuse previously preserved intermediate data (505), the module can retrieve the requested file containing the intermediate data from storage (550) and send the file to the requesting node for reuse (555). For example, a shading node can request filename rasterizing_animal for processing to render an animal with appropriate shading.

Figure 6:
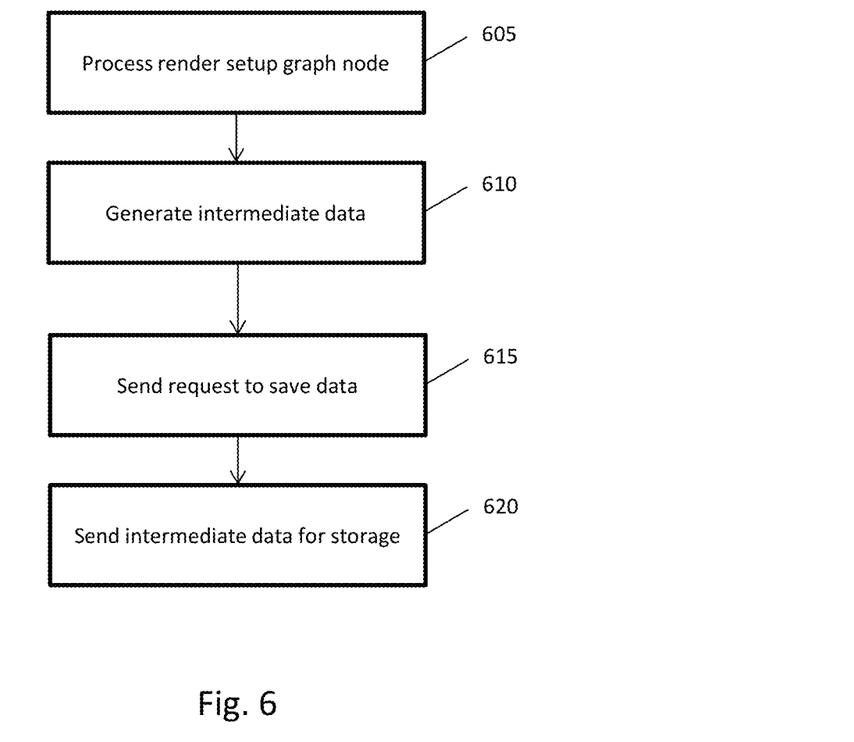
FIG. 6 illustrates an exemplary method for preserving intermediate data generated by a processing node of a render setup graph.

FIG. 6 illustrates an exemplary method for preserving intermediate data generated by a processing node of a render setup graph. This method can be performed by the clients of FIG. 4, for example. In FIG. 6, a client can process a node of a render setup graph (605). During processing, the node can generate intermediate data to be preserved for reuse (610). The node can send a request to a module, for example, the intermediate data file management module of FIG. 4, to preserve the data (615). The node can also send the intermediate data to the module for storage (620). The node can use a logical reference to the file and need not know the actual filename, filepath, or other file implementation details for storing the intermediate data. Rather, the module can manage the file creation and storage using its preserve_data method.

Figure 7:
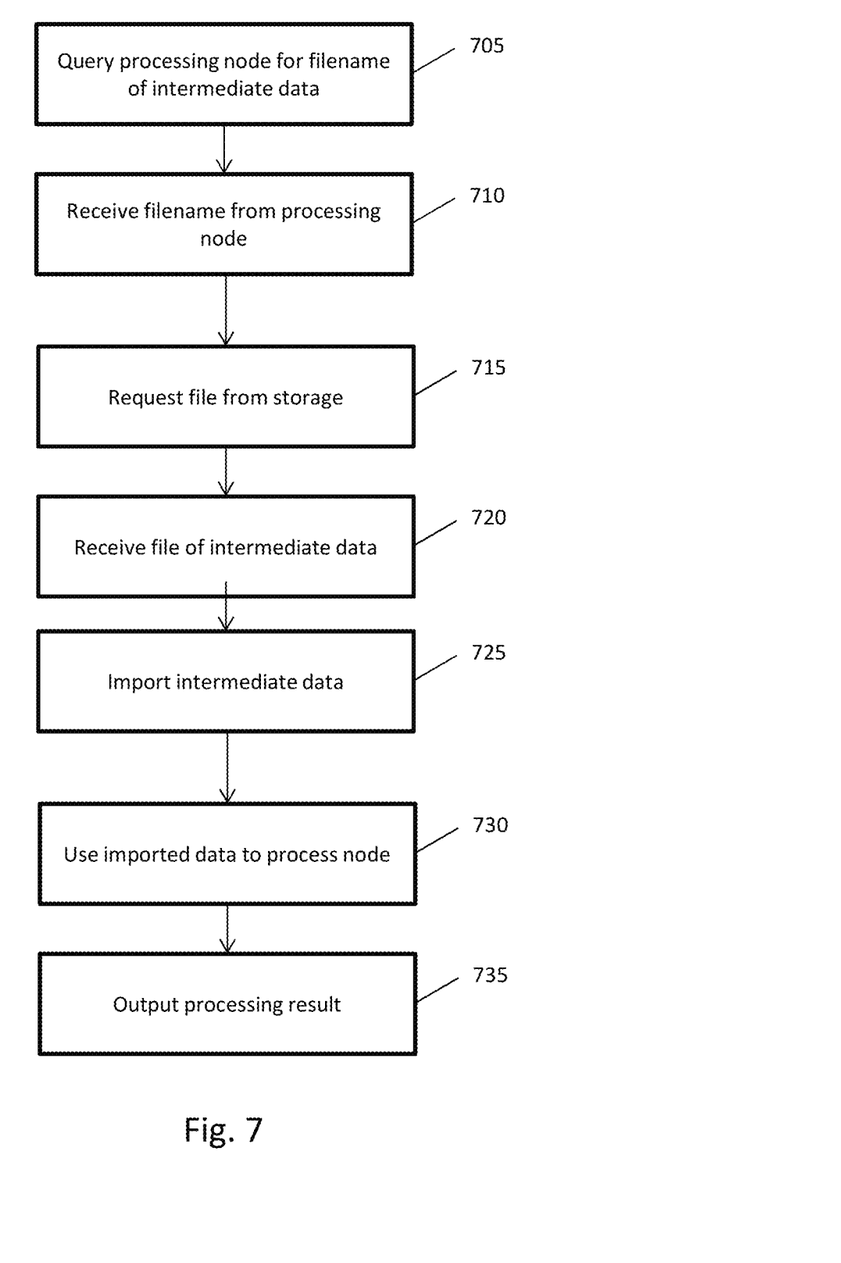
FIG. 7 illustrates an exemplary method for reusing previously preserved intermediate data in a processing node of a render setup graph.

FIG. 7 illustrates an exemplary method for reusing previously preserved intermediate data in a processing node of a render setup graph. This method can be performed by the clients of FIG. 4, for example. In FIG. 7, when a client initiates processing of a node of a render setup graph, the node can query another node that previously generated the intermediate data, for the filename (705). Upon receipt of the filename from the other node (710), the node can send a request to a module, for example, the intermediate data file management module of FIG. 4, to retrieve the file from storage (715). As described above, the node can use a logical reference to the file and need not know the actual filename, filepath, or other file implementation details for retrieving the intermediate data. Rather, the module can manage the file retrieval using its import_preserved_data method. The node can receive the intermediate data from storage (720) and import the data to the node as an input (725). The node can process the imported data (730) and output a result based thereon (735).

The value of the preserved intermediate data can lie in its reuse with a processing node in a different render setup graph than the graph that generated that intermediate data and/or its reuse with a processing node when processing the render setup graph in different contexts.

The value can further lie in the ability for multiple animators or users to share the preserved intermediate data during a collaboration, where a first animator or user can copy intermediate files generated by a second animator or user. The second animator or user can work in a "sandbox," a workspace typically used to test or debug lighting configuration, to process a render setup graph. The first animator or user may want to assist in the testing and debugging or use the intermediate data in some related context. The animators or users can collaborate in the sandbox from different locations, yet have the appearance of local transmission speed: accomplished by localizing cached copies of the intermediate data.

Figure 8:
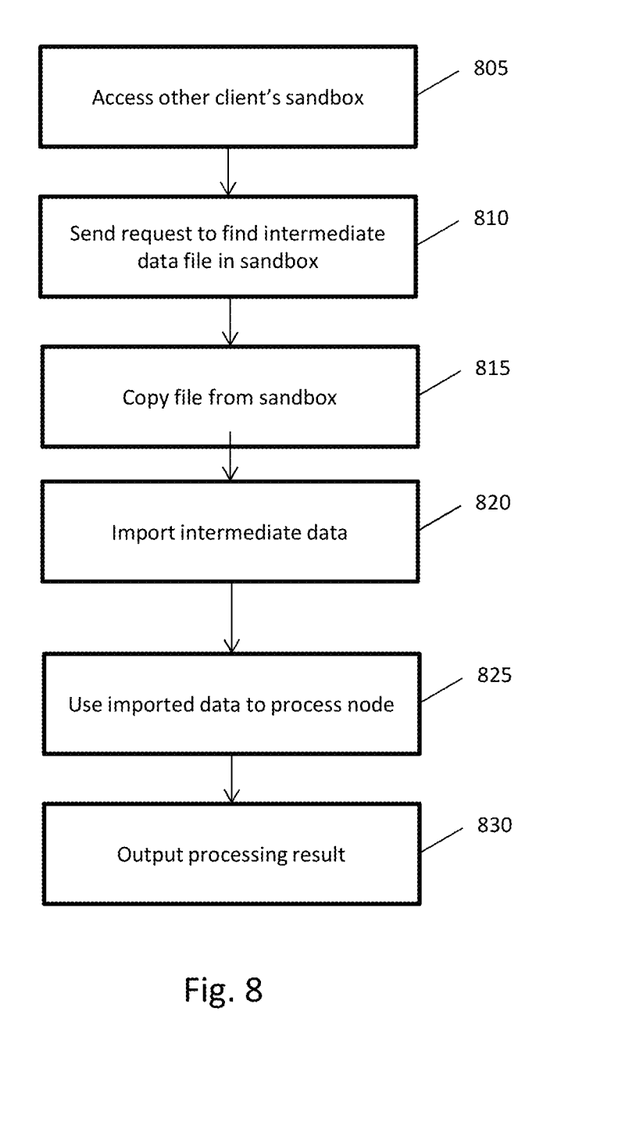
FIG. 8 illustrates an exemplary method for sharing intermediate data generated by a processing node of a render setup graph during collaboration between multiple users.

FIG. 8 illustrates an exemplary method for the animators or users to share intermediate data during a collaboration. This method can be performed by the clients of FIG. 4, for example. In FIG. 8, when a client initiates processing of a node of a render setup graph, the node can access another client's sandbox if the node knows the sandbox owner and in which sandbox the owner is working (805). The client can then send a request to a module, for example, the intermediate data file management module of FIG. 4, to find an intermediate data file in the other client's sandbox (810). The intermediate data can have been either generated by the other client's render setup graph or retrieved from storage by the other client. As described above, the node can use a logical reference to the file and need not know the actual filename, filepath, or other file implementation details or the sandbox implementation detail as related to the intermediate data. Rather, the module can manage the file retrieval using its share_data method. The node can copy the intermediate data from the other client's sandbox (815) and import the data to the node as an input (820). The node can process the imported data (825) and output a result based thereon (830). The other client can continue working without any interruption during the node's copying of the intermediate data.

Figure 9:
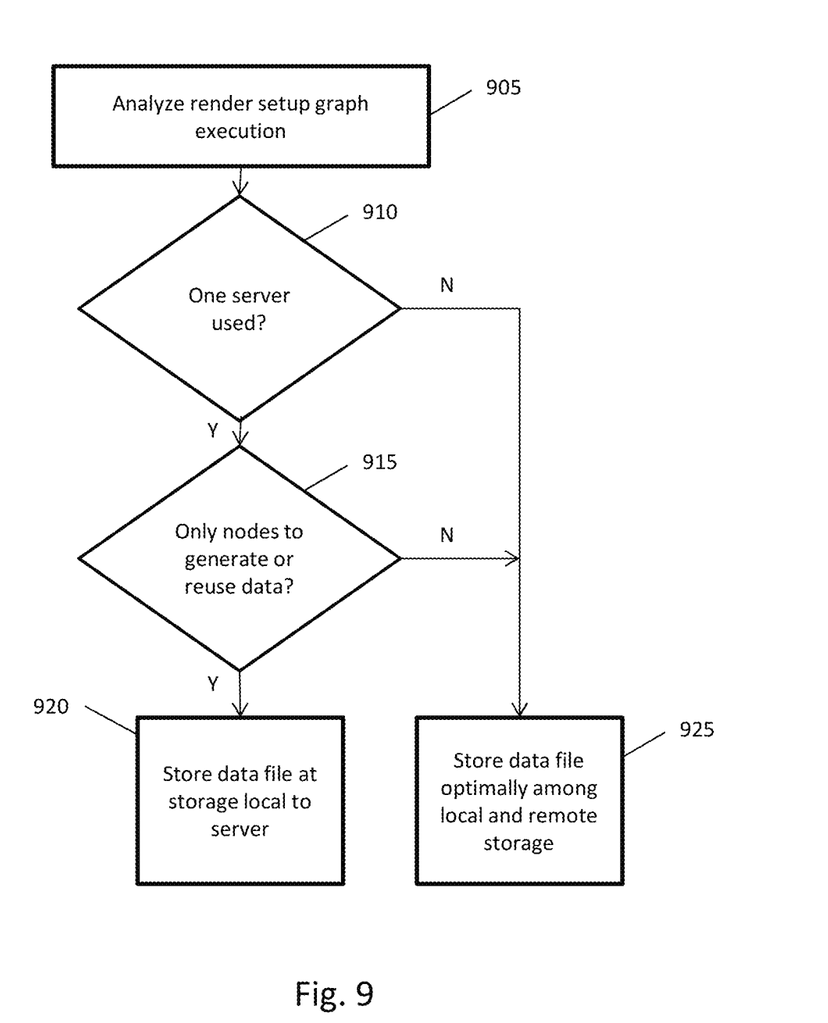
FIG. 9 illustrates an exemplary method for optimizing storage of intermediate data generated by a processing node of a render setup graph.

As described above, the abstraction of the intermediate data file management module of FIG. 4 can allow flexibility in where intermediate data files are stored. Optimal placement of the files can be desirable for fast storage, retrieval, and the like. FIG. 9 illustrates an exemplary method for optimizing storage of intermediate data generated by a processing node of a render setup graph. This method can be performed by intermediate data file management module of FIG. 4, for example. In FIG. 9, the module can analyze a render setup graph's processing, such as the resources it typically uses when processing (905). The module can determine whether the graph's processing runs on a single server (910). The module can further determine whether the graph's nodes are the only nodes in the system that generate and/or reuse a particular set of intermediate data (915). If both conditions are true (905, 910), the module can store the intermediate data files in storage local to the server (920). If none or only one of the conditions is true (905, 910), the module can store the intermediate data files optimally between local storage and/or remote storage based on various factors, such as availability, free space, retrieval speed, relative location to clients, where related processing nodes are executed, and the like (925). The module can determine optimal storage using the manage_file_storage method.

It should be understood that the methods for preserving and reusing intermediate data are not limited to those illustrates in FIGS. 5 through 9, but can include other and/or additional steps capable of performing the preservation or reuse.

Figure 10:
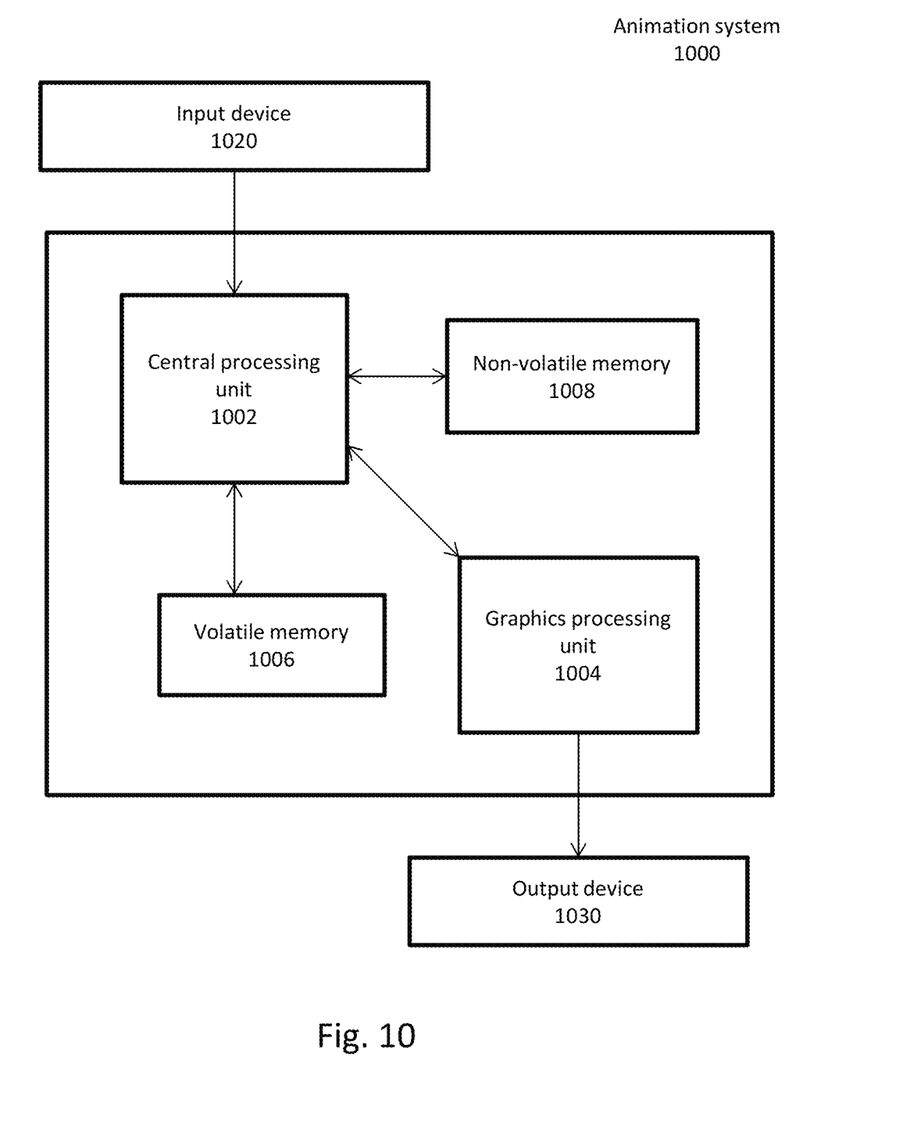
FIG. 10 illustrates an exemplary animation system that preserves and reuses intermediate data for processing nodes of a render setup graph.

FIG. 10 illustrates an exemplary animation system 1000 that can be used to preserve and reuse intermediate data generated by a processing node of a render setup graph, as described above. The preservation and reuse can be implemented, for example, in either hardware or in software stored on a non-transitory computer-readable storage medium. The system can be configured to preserve intermediate data generated by a processing node in a render setup graph, import the preserved data for reuse by a processing node in the same or different render setup graph, optimize the data storage location, and share the data during collaboration between multiple users. The system can be further configured to receive input from a user and to display graphics, an image, or scene of an animation based on the preservation and reuse of intermediate data.

The animation system 1000 can be configured to receive user input from an input device 1020. The input device 1020 can be any device that receives input from the user and transmits it to the animation system 1000. For example, the input device can be a keyboard, a mouse, a tablet, a stylus, or the like. Those skilled in the art will recognize that other types of input devices can also be used.

The animation system 1000 can be configured to output graphics, images, or scenes of an animation to a display device 1030. The display device 1030 can be any device that receives data from the animation system and presents it to the user. For example, the display device can be a liquid crystal display, a set of light emitting diodes, a projector, or the like. Those skilled in the art will recognize that other types of output devices can also be used.

The animation system 1000 can comprise a central processing unit 1002. The central processing unit can comprise one or more processing cores. The central processing unit 1002 can be coupled to and able to communicate with the input device 1020. Although the animation system 1000 is illustrated with one central processing unit 1002, the animation system 1000 can have multiple processing units. The animation system 1000 can also comprise a graphics processing unit 1004. The graphics processing unit 1004 can be dedicated to processing graphics related data. The graphics processing unit 1004 can comprise a single processing core or multiple processing cores. Although the animation system 1000 is illustrated with one graphics processing unit 1004, the animation system 1000 can have a plurality of graphics processing units. The central processing unit 1002 and/or the graphics processing unit 1004 can be coupled to and able to communicate data to the output device 1030.

In one example, the animation system 1000 can comprise one or more processors and instructions stored in a non-transitory computer readable storage medium, such as a memory or storage device, that when executed by the one or more processors, perform preservation and reuse of intermediate data, as described above. In the context of the embodiments described herein, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 1000 can comprise volatile memory 1006, which is a non-transitory computer readable storage medium, in communication with the central processing unit 1002. The volatile memory 1006 can be, for example, random access memory, such as dynamic random access memory or static random access memory, or any other type of volatile memory. The volatile memory 1006 can be used to store data or instructions during the operation of the animation system 1000. Those skilled in the art will recognize that other types of volatile memory can also be used.

The animation system 1000 can also comprise non-volatile memory 1008, which is a non-transitory computer readable storage medium, in communication with the central processing unit 1002. The non-volatile memory 1008 can include flash memory, hard disks, magnetic storage devices, read-only memory, or the like. The non-volatile memory 1008 can be used to store animation data, render setup graph data, computer instructions, or any other information. Those skilled in the art will recognize that other types of non-volatile memory can also be used.

The animation system 1000 is not limited to the devices, configurations, and functionalities described above. For example, although a single volatile memory 1006, non-volatile memory 1008, central processing unit 1002, graphics processing unit 1004, input device 1020, and output device 1030 are illustrated, a plurality of any of these devices can be implemented internal or external to the animation system 1000. In addition, the animation system 1000 can comprise a network access device for accessing information on a network, such as an internal network or the Internet. Those skilled in the art will recognize other configurations of the animation system 1000 can be used.

Figure 11:
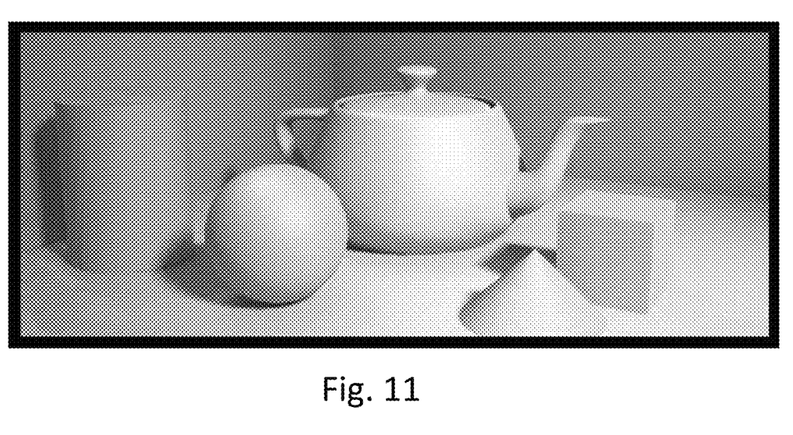
FIG. 11 illustrates an exemplary scene that can be rendered by an animation system that preserves and reuses intermediate data for processing nodes of a render setup graph.

FIG. 11 illustrates an exemplary scene that can be rendered by the animation system of FIG. 10. The scene includes various computer-generated objects created during a rasterizing step and the objects' shading added during a shading step. Intermediate data can be preserved and/or reused in these steps, as described above.

Various exemplary embodiments are described herein. Reference is made to these examples in a non-limiting sense. They are provided to illustrate more broadly applicable aspects of the disclosed technology. Various changes can be made and equivalents can be substituted without departing from the true spirit and scope of the various embodiments. In addition, many modifications can be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which can be readily separated from or combined with the features of any of the other several embodiments without departing from the scope or spirit of the various embodiments.

What is claimed is:

1. A method for preserving and reusing intermediate data of a render setup graph in computer animation using one or more processors and memory, the method comprising:
   receiving a request from a first node of a render setup graph to preserve intermediate data generated by the first node;
   in response to receiving the request from the first node to preserve the intermediate data generated by the first node, storing the intermediate data generated by the first node in a file associated with the first node;
   receiving a request from a second node of the render setup graph to reuse the intermediate data stored in the file associated with the first node, wherein the request from the second node is independent from processing of input data performed by the first node; and
   in response to receiving the request from the second node to reuse the intermediate data generated by the first node, retrieving the file associated with the first node from storage; and sending the retrieved file to the second node for rendering a scene.

2. The method of claim 1, wherein storing the intermediate data comprises:
   determining a storage location for the intermediate data based on at least one of storage availability, amount of free storage space, storage data retrieval speed, the storage location relative to users, or the storage location relative to a processor location rendering the scene,
   wherein the storage location is transparent to the first node.

3. The method of claim 1, further comprising:
   upon receipt of the request from the first node, constructing a name of the file based on at least one of a name of the first node or a context of the render setup graph.

4. The method of claim 1, wherein retrieving the file comprises:
   determining a storage location of the file,
   wherein the storage location is transparent to the second node.

5. The method of claim 1, further comprising:
   configuring the first node to preserve the intermediate data rather than directly send the intermediate data to another node in the render setup graph.

6. The method of claim 1, further comprising:
   configuring the second node to reuse the intermediate data in the file associated with the first node rather than directly receive the intermediate data from another node in the render setup graph.

7. The method of claim 1, further comprising:
   receiving a request from a third node in a second render setup graph to share the intermediate data generated by the first node with the first node during a collaboration between a first user processing the render setup graph and a second user processing the second render setup graph.

8. A non-transitory computer-readable storage medium comprising computer-executable instructions for preserving and reusing intermediate data of a render setup graph in computer animation, the computer-executable instructions comprising instructions for:

receiving a request from a first node of a render setup graph to preserve intermediate data generated by the first node;

in response to receiving the request from the first node to preserve the intermediate data generated by the first node, storing the intermediate data generated by the first node in a file associated with the first node;

receiving a request from a second node of the render setup graph to reuse the intermediate data stored in the file associated with the first node, wherein the request from the second node is independent from processing of input data performed by the first node; and in response to receiving the request from the second node to reuse the intermediate data generated by the first node, retrieving the file associated with the first node from storage; and sending the retrieved file to the second node for rendering a scene.

9. The computer-readable storage medium of claim 8, wherein storing the intermediate data comprises:

determining a storage location for the intermediate data based on at least one of storage availability, amount of free storage space, storage data retrieval speed, the storage location relative to users, or the storage location relative to a processor location rendering the scene, wherein the storage location is transparent to the first node.

10. The computer-readable storage medium of claim 8, further comprising:

upon receipt of the request from the first node, constructing a name of the file based on at least one of a name of the first node or a context of the render setup graph.

11. The computer-readable storage medium of claim 8, wherein retrieving the file comprises:

determining a storage location of the file, wherein the storage location is transparent to the second node.

12. The computer-readable storage medium of claim 8, further comprising:

configuring the first node to preserve the intermediate data rather than directly send the intermediate data to another node in the render setup graph.

13. The computer-readable storage medium of claim 8, further comprising:

configuring the second node to reuse the intermediate data in the file associated with the first node rather than directly receive the intermediate data from another node in the render setup graph.

14. The computer-readable storage medium of claim 8, further comprising:

receiving a request from a third node in a second render setup graph to share the intermediate data generated by the first node with the first node during a collaboration between a first user processing the render setup graph and a second user processing the second render setup graph.

15. An apparatus for preserving and reusing intermediate data of a render setup graph in computer animation, the apparatus comprising:

a memory configured to store data; and a computer processor configured to:

receive a request from a first node of a render setup graph to preserve intermediate data generated by the first node, in response to receiving the request from the first node to preserve the intermediate data generated by the first node, store the intermediate data generated by the first node in a file associated with the first node, receive a request from a second node of the render setup graph to reuse the intermediate data stored in the file associated with the first node, wherein the request from the second node is independent from processing of input data performed by the first node, and in response to receiving the request from the second node to reuse the intermediate data generated by the first node, retrieve the file associated with the first node from storage, and send the retrieved file to the second node for rendering a scene.

16. The apparatus of claim 15, wherein the computer processor configured to store the intermediate data:

determines a storage location for the intermediate data based on at least one of storage availability, amount of free storage space, storage data retrieval speed, the storage location relative to users, or the storage location relative to a processor location rendering the scene, wherein the storage location is transparent to the first node.

17. The apparatus of claim 15, wherein the computer processor is further configured to:

upon receipt of the request from the first node, construct a name of the file based on at least one of a name of the first node or a context of the render setup graph.

18. The apparatus of claim 15, wherein the computer processor configured to retrieve the file:

determines a storage location of the file, wherein the storage location is transparent to the second node.

19. The apparatus of claim 15, wherein the computer processor is further configured to:

configure the first node to preserve the intermediate data rather than directly send the intermediate data to another node in the render setup graph.

20. The apparatus of claim 15, wherein the computer processor is further configured to:

configure the second node to reuse the intermediate data in the file associated with the first node rather than directly receive the intermediate data from another node in the render setup graph.

21. The apparatus of claim 15, wherein the computer processor is further configured to:

receive a request from a third node in a second render setup graph to share the intermediate data generated by the first node with the first node during a collaboration between a first user processing the render setup graph and a second user processing the second render setup graph.

22. A system for preserving and reusing intermediate data of a render setup graph in computer animation, the system comprising:

at least one client device configured to process a render setup graph so as to generate intermediate data to preserve and to reuse the preserved intermediate data;

at least one storage device configured to store the generated intermediate data; and a data management device configured to:

receive a request from the at least one client device to preserve the generated intermediate data, in response to receiving the request from the at least one client device to preserve the generated intermediate data, store the generated intermediate data on the at least one storage device, receive a request from the at least one client device to reuse the preserved intermediate data stored on the at least one storage device, wherein the request from the at least one client device to reuse the preserved intermediate data is independent from processing of input data performed by the at least one client device, and in response to receiving the request from the at least one client device to reuse the preserved intermediate data, retrieve the preserved intermediate data from the at least one storage device, and send the retrieved intermediate data to the at least one client device for rendering a scene.

* * * * *